Figure 1:
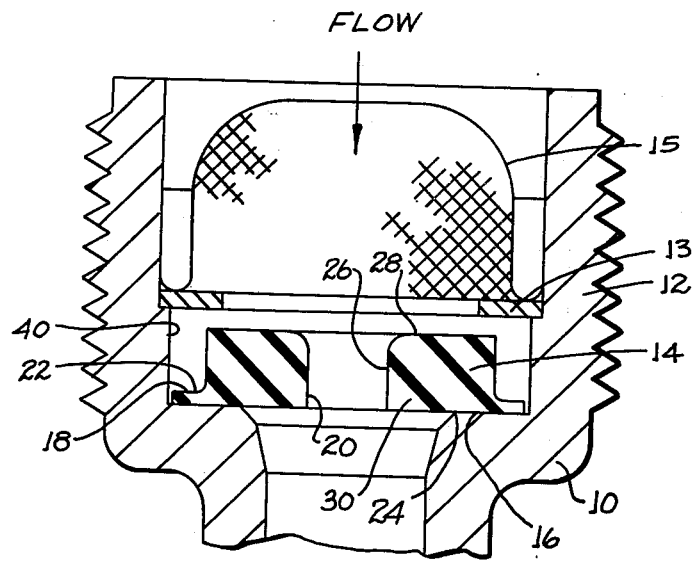

INVENTOR.
PHILLIP GEORGE HONSINGER
BY
SMITH, WILSON, LEWIS & McRAE

# United States Patent Office 3,077,903
Patented Feb. 19, 1963

3,077,903
FLOW CONTROL DEVICE
Philip George Honsinger, St. Clair Shores, Mich., assignor to American Radiator & Standard Sanitary Corporation, New York, N.Y., a corporation of Delaware
Filed Apr. 2, 1959, Ser. No. 803,619
2 Claims. (Cl. 138—45)

This invention relates to a fluid flow control mechanism operable to maintain substantially constant volumetric delivery therethrough in the presence of substantial variations in pressure drop. The invention has particular application in water lines of domestic automatic washing machines, although it is susceptible to use in other fluid lines as well.

During the past several years annular flow control devices have been developed for delivering substantially constant volumetric deliveries in the presence of substantial variations in inlet pressure. These devices usually take the form of an annular rubber element seated on the upstream face of a shoulder positioned in a fluid line, the construction of the device being such that high fluid pressures on its upstream face portion are effective to reduce the area of the central opening in the element for choking the flow in such manner as to maintain a substantially constant volumetric delivery over fairly wide fluctuations in inlet pressure. The flow annulus devices have been of generally two constructions, one construction wherein the inner portion of the flow annulus projects radially beyond the opening defined by the shoulder to permit it to deflect under the force of high fluid pressures with a "hinge-like" action so as to vary the flow annulus opening. In the other form the flow annulus has been constructed of rubber-like deformable material of such character that the fluid pressures are effective to axially compress the annular portions of the flow annulus so as to squeeze the annulus axially to effect the desired reduction in flow annulus opening area.

With both types of flow control constructions the flow annulus has had to have a clearance with respect to the surrounding casing walls to facilitate manufacturing operations and permit the flexing or deformation required for reducing the flow opening area at high pressures. This clearance allows the inlet fluid to flow around the periphery of the flow annulus at low pressures, thus bypassing the flow annulus opening and exerting a pulsating action on the annulus tending to vibrate the annulus from its seating engagement with the shoulder. The result is that the flow annulus tends to float on the shoulder at low inlet pressures so as to produce an audible shrill whistling noise. At higher fluid pressures the fluid forces the flow washer tightly onto the seating surface, and eliminates the whistling noise.

At the low fluid pressures the floating effect which is given to the flow washer causes a considerable quantity of fluid to by-pass the central opening in the flow annulus, and the total volumetric delivery through the device is therefore not proportional to fluid pressure in the desired manner. This inaccuracy in flow control action at the low fluid pressures is objectionable in many situations wherein the fluid line pressures are relatively low. The conventional two gallon per minute flow control device of the "deflectable" type is normally ineffective to control fluid at fluid pressures below 15 p.s.i. The conventional two gallon per minute "deformable" type flow washers are normally ineffective at fluid pressures below approximately 20 p.s.i.

The pressure at which the flow control begins to be effective for volumetric control purposes is normally referred to as the "threshold" pressure, and it is an object of the present invention to provide a flow control which operates effectively at high fluid pressures, while at the same time having a relatively low threshold pressure, i.e., a flow control which is operable over a relatively wide range of pressures including a low pressure range.

It has been previously pointed out that the conventional flow control devices commonly produce a shrill whistling noise at low fluid pressures, particularly fluid pressures below the threshold pressure. Accordingly, it is an object of the present invention to provide a flow control which is operable at relatively low fluid pressures to eliminate the whistling or other audible noises.

A further object of the invention is to provide a flow control construction having the above-mentioned "anti-whistling" and "low threshold pressure" features, while being susceptible to manufacture as a low-cost device.

Other objects of this invention will appear in the following description and appended claims, reference being had to the accompanying drawings forming a part of this specification wherein like reference characters designate corresponding parts in the several views.

Figure 2:
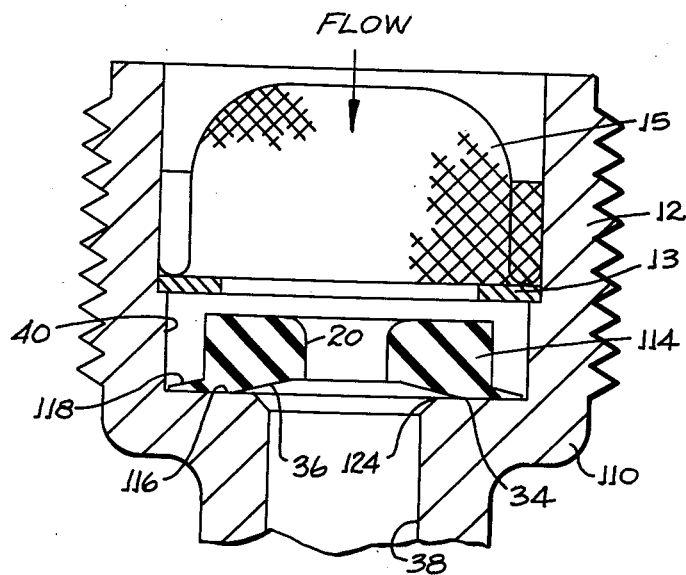

In the drawings:

FIGURE 1 is a sectional view taken through a flow control mechanism forming one embodiment of the invention; and FIG. 2 is a sectional view taken through a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIG. 1 of the drawings, there is shown a flow control mechanism comprising a casing structure 10 which may be formed as an integral part of an inlet 12 for a water mixing valve (not shown in its entirety), said water mixing valve being commonly employed for the proportioning of hot and cold water to the tub of an automatic washing machine. It is desirable that the rate of fluid flow be substantially constant in the fluid streams to insure correct proportioning of the different temperature fluids. Accordingly there is provided within casing structure 10 a resilient rubber-like flow annulus 14 seated on an annular shoulder or seat 16 defined by an internal surface of casing structure 10. A retainer ring 13 may be provided to loosely hold flow annulus 14 in position and serve as a mounting surface for conventional strainer screen 15.

Flow annulus 14 is provided with a relatively thin peripheral flange or skirt 18 which sealably engages the shoulder 16 to prevent flow of fluid by-passing the central opening 20 in annulus 14. Flange 18 should be of relatively thin character so as to render it relatively easily flexed by the fluid pressures against its surface 22. In this connection it will be understood that the sealing action is actually obtained by the fluid pressures acting on surface 22 so as to tightly force flange 18 into tight sealing engagement against shoulder surface 16. By constructing flange 18 as a relatively thin easily flexed element relatively low fluid pressures are enabled to provide the desired sealing action. The thinness of flange 18 (in the axial direction) may be varied somewhat depending on the installation and operating pressures, but in a typical illustration the flow annulus was constructed with flange thickness of about .025 inch, with a material having a durometer of 48.

It will be noted that the annular edge 24 defined by shoulder 16 is spaced radially outwardly from the inner surface 26 of flow annulus 14 so as to enable fluid pressures to act on the upstream face portion 28 of the flow annulus for deflecting annular flow orifice portion 30 in a downstream direction, the action being such as to reduce the flow opening defined by flow opening 20 so as to maintain a relatively constant volumetric flow through the casing structure. At low fluid pressures, the force on face 28 is lessened, and the resilient flow annulus material is effective to move the annulus portion 30 in an upstream direction toward its FIG. 1 position so as to enlarge the flow opening 20 for compensating for the decreased pressure. The action is such so as to maintain relatively constant volumetric flow through the device irrespective of substantial variations in inlet pressure. The illustrated flow control is of the "deflectable" type as opposed to the axially "deformable" type previously discussed. The "deflectable" type flow annulus structures conventionally have lower threshold pressures than the "deformable" type flow annulus structures, due to the fact that less fluid pressure is required to deflect an unsupported portion of the flow annulus than is required to axially compress the entire flow annulus. Because of the inherent ability of the "deflectable" type flow annulus to operate at lower threshold pressures it is preferred under the present invention to utilize the "deflectable" type.

In conventional flow control constructions, at low fluid pressures the fluid has a tendency to flow around the flow annulus periphery and along the seating shoulder, as well as through the flow annulus central opening. This tendency is due to the fact that the low fluid pressures are insufficient to tightly seat the flow annulus on the support shoulder. The flow annulus thus "floats" on the shoulder and allows more than the desired quantity of fluid to pass through the casing. In other words the flow annulus loses its control at the low pressures. Additionally, the "floating" action produces an objectionable shrill whistling noise.

In the present construction the flange or skirt 18 becomes effective to seal against surface 16 at very low fluid pressures, and there is no by-passing of the fluid around the flow annulus opening. As a result, the objectionable shrill whistling noise is eliminated, and the device begins to correctly control the flow at a lower pressure. At the same time the device retains its control at the higher fluid pressures to the same extent as corresponding conventional constructions.

The device as shown in FIG. 2 is in many respects similar to that shown in FIG. 1, and similar reference numerals are employed wherever applicable. In the FIG. 2 arrangement the flow annulus 114 is provided with a peripheral skirt or flange 118 having the same function as the corresponding flange in the FIG. 1 construction; it being noted however that flange 118 is tapered to a feather edge for providing a very easily flexed outer edge portion susceptible to being tightly sealed against shoulder 116 at very low fluid pressures. Shoulder 116 in the FIG. 2 construction extends inwardly to a point 124 spaced radially inward from point 34 on the lower face of annulus 114. The lower face of annulus 114 is flared upwardly and inwardly at 36 beginning from point 34 and ending adjacent the central opening 20. The provision of this upwardly-inwardly flaring surface 36 enables annulus 114 to deflect under fluid pressures without having the deflecting portion at any time engage the surface of shoulder 116. By this arrangement the requirement for close-tolerance formation of the seating surface is eliminated, and the area of flow passage 38 can be varied considerably without affecting the operation of the device.

The FIG. 2 construction operates in substantially the same manner as the FIG. 1 construction, the principal purpose in showing the FIG. 2 construction is merely to illustrate that variations in flow annulus design may be affected without departing from the spirit of the invention.

The drawings illustrate shoulder surfaces 16 and 116 as formed integrally with the casing structures 10 and 110. However, it will be appreciated that these shoulder surfaces can be formed as separate insert elements. Also the drawings illustrate flanges 18 and 118 as extending from the flow annulus elements into close adjacency to the internal casing surfaces 40. However, it will be appreciated that the sealing engagement may be made primarily on the shoulders 16 and 116 so that it is not necessary in all installations that flanges 18 and 118 extend entirely to surface 40. The drawings illustrate the flow construction as part of the inlet of a water mixing valve. However, it will be appreciated that the flow control device may be constructed separately from a mixing valve, and may be formed integrally or separately from different valves and other flow regulating devices controlling various different fluid streams.

Various other changes may be made in the construction, without materially departing from the spirit of the invention as defined in the appended claims.

I claim:
1. In a fluid flow control device for maintaining substantially uniform volumetric fluid delivery rates therethrough,
  a fluid containing casing having a fluid inlet, a fluid outlet and an annular shoulder therebetween,
  a free floating flow control washer operable upon said shoulder,
  said flow control washer comprising a resilient annular body having an axially extending flow orifice and axially spaced inlet and outlet faces transverse to the axis,
  said annular body being of substantial axial and radial thickness so that compression by inlet fluid pressure is effective to reduce the flow orifice opening area,
  and a thin, flexible annular flange formed integrally with the periphery of said body at said outlet face,
  said flange having an axially facing surface,
  and said axially facing surface being freely operatively positionable against said shoulder by the pressure of inlet fluid flowing through said casing to effectively seal against said shoulder even at low inlet pressures.

2. In a fluid flow control device,
  a casing defining an inlet chamber and an outlet chamber with an annular shoulder therebetween,
  a free floating flow control washer operable upon said shoulder,
  said washer having a resilient, generally cylindrical body and having an axially extending flow orifice and axially spaced inlet and outlet faces transverse to the axis, said body being of substantial axial and radial thickness so that compression by inlet fluid pressure is effective to reduce the flow orifice opening area,
  and a thin, flexible annular flange formed integrally with the periphery of said body,
  said flange being freely operatively positionable against said shoulder by the pressure of inlet fluid flowing through said casing to effectively seal against said shoulder even at low inlet chamber pressures.

References Cited in the file of this patent
UNITED STATES PATENTS

| | | |
|---|---|---|
| 2,454,929 | Kempton | Nov. 30, 1948 |
| 2,462,493 | Hamer | Feb. 22, 1949 |
| 2,775,984 | Dahl | Jan. 1, 1957 |
| 2,781,058 | Warhus | Feb. 12, 1957 |
| 2,815,041 | Rimsha et al. | Dec. 3, 1957 |
| 2,815,923 | Clark | Dec. 10, 1957 |